United States Patent
Flachsbarth

[15] 3,688,133
[45] Aug. 29, 1972

[54] CIRCUIT ARRANGEMENT FOR DETERMINING THE POSITION OF A MOVABLE OBJECT

[72] Inventor: Dieter Flachsbarth, Steinbruchweg 10, Ruckersdorf, Germany

[22] Filed: Oct. 12, 1971

[21] Appl. No.: 188,102

[30] Foreign Application Priority Data

Oct. 13, 1970 Germany..........P 20 50 127.3

[52] U.S. Cl...................................307/309, 307/255
[51] Int. Cl..............................................H03k 17/00
[58] Field of Search ........307/309; 324/45; 323/94 H

[56] References Cited

UNITED STATES PATENTS 3,230,407  1/1966  Marsh Jr..............323/94 H U
3,482,163  12/1969  Peek et al. ................324/45 X Primary Examiner—Donald D. Forrer
Assistant Examiner—B. P. Davis
Attorney—Arthur E. Wilfond et al.

[57] ABSTRACT

In a system for tracking the position of a movable object, a magnet attached to the object causes current flowing through a semi-conductor element of the tracking apparatus to shift its position in the semi-conductor body by the Hall effect and to generate thereby a Hall potential on output electrodes of the semi-conductor body. The Hall potential is thereafter amplified and furnished to indicating or tracking equipment. The loss of amplifier output signal as the Hall potential approaches 0 and, passing through its null, rises to the amplifier threshold voltage is avoided in a circuit arrangement supplying the amplifier output potential to a pair of complementary type transistors cross-coupled to a following pair of output transistors in such a way that one of the output transistors is blocked at all times except during the null of the Hall potential.

6 Claims, 1 Drawing Figure

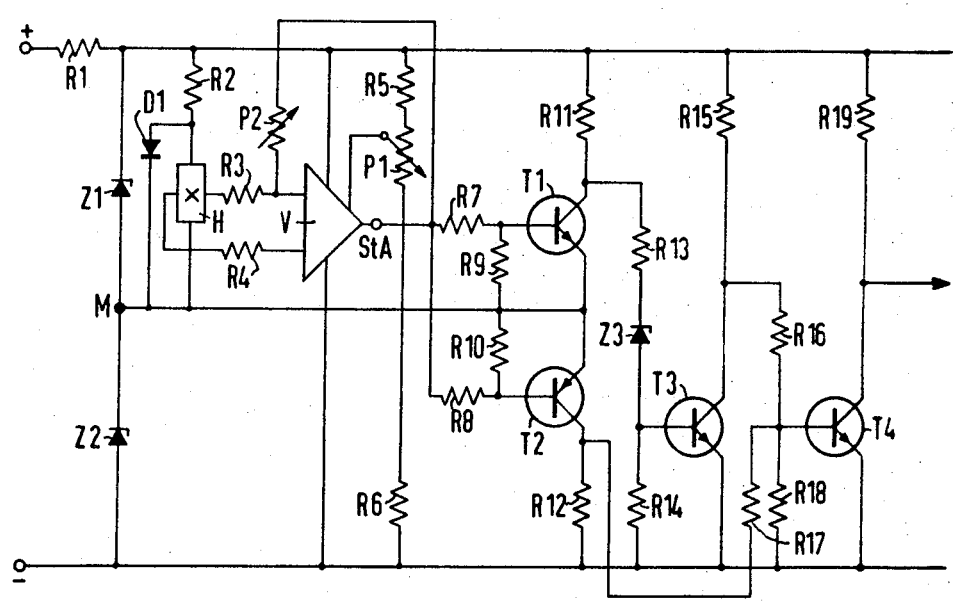

CIRCUIT ARRANGEMENT FOR DETERMINING THE POSITION OF A MOVABLE OBJECT

The invention concerns a circuit arrangement for determining the position of a movable object in which an amplifier connected to a Hall generator and the coordination between the Hall generator and a control magnet mounted on the movable object are so constituted that the Hall potential goes through at least one 0 point.

A system for continuously determining the position of a movable object of the Hall generator type utilizes a permanent magnet affixed to the object that influences the Hall effect semi-conductor element of a Hall generator as a result of the known effect of a magnet field on the current flow through a semi-conductor. A steady current is caused to flow through the semi-conductor element, applied to input electrodes at each end. The Hall potential appears across transverse electrodes as a result of deflection of the charge carriers by the magnetic field. The movement of the magnet causes the Hall potential to vary and the potential may be reversed as the magnet affixed to the moving body changes its position so as to deflect the current towards the other Hall electrode. Systems of this type are of interest in which the course of movement of the moving body causes the Hall potential to go through 0, o, usually in connection with a reversal of the Hall potential, at least once in every cycle or observation of movement of the moving body.

In the usual circuit arrangement for the system just described the amplifier operates as soon as the Hall potential, after passing through 0, reaches the threshold value of the amplifier. The amplifier likewise drops out when the Hall potential, before going through 0, falls below the threshold value of the amplifier. The threshold value of the amplifier, in combination with the steepness of the null point of the Hall potential can thus determine the control accuracy.

The steepness of the null through which the Hall potential passes depends upon the distance at which a control magnet and a Hall generator are moved relative to each other. In the course of particular evolutions of a movable object, the distance between the Hall generator and the control magnet cannot practically be held constant. The Hall potential shows a correspondingly varying null steepness, so that the amplifier comes into operation or drops out at different intervals as the Hall potential goes through 0. The null passage itself is independent of the distance between the control magnet and the Hall generator and lies always in the same place on the path of movement of the object, the position of which is being determined.

There is accordingly a need for a circuit arrangement of the class above described with which control continues to be possible while the Hall potential is passing through 0. Likewise, when the precise indication of the null position is particularly desired, as when it is desired to ignite a strobe light at the instant of the null for checking the synchronization of machinery, it is important to provide an indication of the null with an accuracy less dependent on the null width. These needs are met according to the present invention by feeding the output of the amplifier to the control circuits of two transistors of complementary types connected in cascade between the two poles of a d.c. voltage source, in series with their respective load resistors and with their common connection point connected to a center tap of the d.c. voltage source. The transistors of this complementary type pair may be referred to as the input transistors of the circuit of this invention. Connected to the collector of the first of these input transistors, with a Zener diode and a resistor in the coupling path, is the control circuit of a first output transistor having its base connected to the said control circuit and its load circuit connected to the d.c. voltage source over a first output load resistor, this output transistor further having its collector connected to the control circuit of a second output transistor, which has its load circuit connected to the d.c. voltage source over a second output load resistor and its base connected to the collector of the second input transistor over a cross-coupling resistor. Output signals are taken from the second output transistor just described, which is in its conducting state only during the null. According to a further development of the invention, the circuit arrangement can also be connected to a d.c. voltage supply without center tap, if a series connection of two Zener diodes of the same type is connected in parallel to the circuit arrangement, with the common connection of the Zener diodes being connected to the common connection of the complementary pair of input transistors.

The invention is further described below with reference to an illustrative embodiment thereof of which a circuit diagram is shown in the single FIGURE of the annexed drawing.

As showq in the drawing, two Zener diodes $Z_1$ and $Z_2$ connected in cascade are connected across a d.c. voltage source over a first input series resistor R1. The common connection point of the two Zener diodes provides the center tap M of the d.c. voltage source. Between the center tap M and the common connection point of the Zener diode Z1 and the first series input resistor R1, which is in effect a regulated voltage supply terminal, the control circuit of a generator H is connected in series with a second series input resistor R2. This circuit furnishes the current to the Hall effect element. For compensation of temperature variations, a diode D1 poled in its conducting direction is connected in parallel to the control electrodes of the Hall generator. The Hall potential electrodes of the Hall generator are connected to the control input of an amplifier V, respectively over control resistances R3 and R4. Amplifier V is likewise connected to the d.c. voltage source. By means of a potentiometer P1 connected in series with resistors R5 and R6 across the d.c. voltage source, the input voltage for the amplifier output null can be set. By means of an adjustable feedback resistor P2 connected between the output and the control input of the amplifier, the amplification of the amplifier can be adjusted.

The control signal output point StA of the amplifier V is connected both to the control circuit, made up of two control resistors R7 and R9, of a first input transistor T1 and to the control circuit, made up of two control resistors R8 and R10, of a second input transistor T2. The two input transistors T1 and T2 are of mutually complementary types, and each, in series with its collector resistor, respectively R11 and R12, is connected between one pole of the d.c. voltage source and the common connection point M of the Zener diodes Z1 and Z2. The collector of the first input transistor T1 is connected to the control circuit of a first output transistor T3. The control circuit of the transistor T3 consists of two resistors R13 and R14 and a Zener diode Z3 connected between those two resistors. The base of the first output transistor T3 is connected to the anode of the Zener diode Z3 and its load circuit is connected to the two poles of the d.c. voltage source over a first output load resistor R15. The control circuit of a second output transistor T4, consisting of resistors R16 and R18, is connected to the collector of the first output transistor T3, and the base of this second output transistor T4, in addition to being connected to the common connection point of resistors R16 and R18, is also connected by a cross-coupling resistor R17 with the collector of the second input transistor T2. The load path of the second output transistor T4 is likewise connected between the poles of the d.c. voltage source over a second load resistor R19. Output signals are taken off from the collector of this second output transistor T4.

The manner of operation of the circuit arrangement is as follows:

A movable object, not shown in the drawing, connected to a control magnet, likewise not shown, is so coordinated with Hall generator H that, in the course of relative movement of the control magnet with respect to the Hall generator, the Hall potential excited in the Hall generator passes through at least one null. If, for example the control magnet is moved past the Hall generator H, there appears at the Hall potential electrodes according to the location of the control magnet either a positive or negative Hall potential which controls the amplifier V accordingly. If the Hall potential is positive, the output control signal of the amplifier V is likewise positive and the first input transistor T1 will be turned on. The control circuit of the first output transistor T3 will thereby be placed at the potential of the common connection point of Zener diodes Z1 and Z2. Since the Zener voltage of Zener diode Z3 corresponds to the steady voltage between the negative terminal of the d.c. voltage source, and the common connection between the Zener diodes Z1 and Z2, this entire voltage appears across the Zener diode Z3, and the first output transistor T3 remains turned off. The control circuit of the second output transistor T4, connected to the collector of the first output transistor T3, receives the supply voltage over the first output load resistor R15. The second output transistor T4 is accordingly turned on. At the collector of the second output transistor T4 negative potential appears, that is, no output signal appears.

If a negative Hall potential is applied to the amplifier V, a negative control signal then appears at its output. By such a negative control signal the second input transistor T2, which is complementary to the first input transistor T1, is turned on. The first input transistor T1 is at the same time turned off, so that over its collector resistance R11 the control circuit of the first output transistor T3 is put at the full voltage of the d.c. voltage source. Since only half that voltage appears across the Zener diode Z3 connected in the control circuit of the first output transistor T3, this output transistor is now turned on and the control circuit of the second output transistor T4 is thereby shunted down, thus tending to turn off the second output transistor T4. This blocking effect is however opposed by the connection of the base electrode of the second output transistor T4 over the cross-coupling resistor R17 to the collector of the second input transistor T2. The latter is, as just mentioned, turned on so that its collector is substantially at the potential of the common connection point of the Zener diodes Z1 and Z2. This potential, which is positive relative to the negative terminal of the d.c. voltage source, is provided over the cross-coupling resistor R17 to the base of the second output transistor T4 and turns the latter on, so that its collector again supplies negative voltage to the output and no output signal appears. Thus an output signal at the output of the circuit arrangement appears neither in the case of a negative Hall potential nor in the case of a positive one.

As the Hall potential goes through 0, no control signal appears at the output of amplifier V, so that both input transistors T1 and T2 are in the blocked condition. The first output transistor T3 receives, as just described, a control voltage over the collector resistor R11 of the first input transistor T1 that turns it on or else keeps it on, so that it applies a blocking negative potential on the control circuit of the second output transistor T4. Since the second input transistor T2 is likewise blocked, a blocking negative potential is likewise applied to the second output transistor T4 over the cross-coupling resistor R17 and collector resistor R12 of second input transistor T2. Thus the second output transistor T4 is blocked while the Hall potential passes through 0, so that during the time the transistor is blocked a plus potential is present at its collector that serves as an output signal for supply to further control or indicating equipment (not shown) of known form.

The output signal of the circuit arrangement of this invention may be used directly to indicate the null position in a system designed so that the null position is a critical or reference position of the trajectory of the magnet affixed to the moving object. Thus for example the output signal can be used to ignite a strobe light (not shown) for showing the precise position of moving machinery (and its possible variations, such as librations, from cycle to cycle) when some particular part carrying the control magnet, passes through a reference position. In a similar way the output signal of the present circuit can be used to trigger the time base of an oscilloscope (not shown) on which other phenomena relating to a moving system are displayed.

The output signal of the circuit arrangement of this invention can also be used indirectly to turn on, or to increase the amplification of, another amplifier (not shown) used to amplify the Hall potential signal so that a fine scale control will be available during the null for the operation of a continuous indicator (not shown) of the position of the movable object.

For increasing the accuracy of the circuit arrangement, a diode D1 poled in its conducting direction is connected in parallel with the control electrodes of the Hall generator. The presence of this diode modifies the amount of current flowing through the control electrodes of the Hall generator H in such a way as to compensate for temperature fluctuations. A correction of the 0 voltage output condition of the amplifier V can be made by means of the potentiometer P1 which is connected between resistors R5 and R6 in series across the d.c. voltage source, with the tap of potentiometer T1 connected with the null correction terminal of the amplifier. An adjustable resistor P2 connected between the output signal and input signal connections of the amplifier V permits the amplification to be adjusted and thereby also the duration of the output signal while the Hall potential passes through 0, which is to say the width of the null.

The circuit arrangement of the invention can be used for measuring rotary speed, the output signal being fed to an electronic counter stage through which the rotary speed is registered or indicated.

Furthermore, the possibility exists of controlling elevators with this circuit arrangement. Control magnets are accordingly disposed at the individual floors and the signal released by the control magnets through the switching apparatus is fed to a transistor-switch step, through which the elevator is stopped.

The circuit arrangement can furthermore be used for monitoring the level of a liquid in a container. The control magnet is connected with a float, in such a case, and is caused to pass the Hall generator when the liquid level rises or drops. The control signal appearing at the output of the circuit arrangement can be fed to a transistor-switch step through which, for example, a pump can be switched on or off.

What is claimed is:

1. Apparatus for determining the position of a moving object in cases in which the moving object has a characteristic magnetic field, produced by a permanent magnet connected thereto comprising:
    a. a Hall effect potential generator;
    b. a direct current voltage supply and means providing a voltage mid-point thereof with low supply impedance;
    c. an amplifier having a balanced input connnected to the Hall potential terminals of said Hall generator and having an output connection adapted to provide a signal ranging from voltages positive with respect to said mid-point to voltages negative with respect to said mid-point;
    d. means for setting the null of said output signal to correspond with the null at said Hall potential electrodes;
    e. a pair of complementary type transistors having their load circuits connected in series and having their control electrodes both coupled through coupling resistors to sad output terminal of said amplifier, said load circuits including load resistors respectively connecting a load path electrode of each of said transistors of said pair to the terminals of said direct current voltage source, and having a connection connecting the other load path electrodes of said pair of transistors to each other and to said midpoint;
    f. a first output transistor having its base coupled, by resistance coupling with a Zener diode in the series branch thereof, to the load or load terminal of one transistor of said pair and having a first output load resistor connected thereto, said diode being poled in its forward direction with respect to the polarity of said source of direct current voltage; and
    g. a second output transistor having a second output load resistor connected thereto and having its base connected by resistance coupling to said first output load resistor and also connected by a cross-coupling resistor to the load or load terminal of the other transistor of said pair, whereby when said Hall potential passes through 0, neither transistor of said pair is conducting and then, and only then, said second output transistor is non-conducting and provides across said second output load resistor a signal precisely during said passage through 0 of said Hall potential.

2. Apparatus as defined in claim 1 in which said means for providing said mid-point consists of a pair of Zener diodes in cascade across said source of direct current voltage and in which a series input resistor is provided on the supply side of said pair of Zener diodes.

3. Apparatus as defined in claim 2 in which the load path electrodes of said pair of transistors that are connected together are the emitters of said transistors and in which the load path electrode of said transistors that are respectively connected to said load resistors are the collectors of said transistors.

4. Apparatus as defined in claim 3 in which the transistor of said pair which is coupled to said second output transistor by said cross-coupling resistor transistor is the transistor of said pair which is of the type complementary to the conductivity type of said second output transistor, in which also said first and second output transistors are of the same conductivity and in which the emitters of said first and second output transistors are connected to the same terminal of said direct current voltage supply as the load resistor of said complementary type transistor of said pair.

5. Apparatus as defined in claim 4 in which the emitters of said first and second output transistors are connected to the negative terminal of said direct current supply and in which the said series input resistor is connected to the positive terminal of said direct current voltage supply.

6. Apparatus as defined in claim 4 in which all three Zener diodes have substantially the same Zener voltage.

* * * * *